(12) United States Patent
Van Rheenen et al.

(10) Patent No.: US 9,399,710 B2
(45) Date of Patent: Jul. 26, 2016

(54) THERMOPLASTIC COMPOSITION, METHOD OF PRODUCING THE SAME, AND ARTICLES MADE THEREFROM

(71) Applicant: Rohm and Haas Company, Philadelphia, PA (US)

(72) Inventors: Paul R. Van Rheenen, Warminster, PA (US); Veera Nelliappan, North Wales, PA (US); Seth T. Stewart, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/702,964

(22) Filed: May 4, 2015

(65) Prior Publication Data

US 2015/0232655 A1    Aug. 20, 2015

Related U.S. Application Data

(62) Division of application No. 13/270,040, filed on Oct. 10, 2011, now Pat. No. 9,051,459.

(60) Provisional application No. 61/408,203, filed on Oct. 29, 2010.

(51) Int. Cl.
| | | |
|---|---|---|
| C08L 25/12 | (2006.01) | |
| C08L 27/06 | (2006.01) | |
| C08L 33/06 | (2006.01) | |
| C08L 33/20 | (2006.01) | |
| C08L 25/14 | (2006.01) | |

(52) U.S. Cl.
CPC .................. *C08L 33/20* (2013.01); *C08L 25/14* (2013.01); *C08L 27/06* (2013.01); *C08L 33/066* (2013.01)

(58) Field of Classification Search
CPC ......... C08L 25/12; C08L 27/06; C08L 51/06; C08L 2207/53; C08L 33/08; C08L 33/10; C08L 33/12; C08L 220/14; C08L 265/06
See application file for complete search history.

(56) References Cited

U.S. PATENT DOCUMENTS 7,179,852 B2 *    2/2007    Schultes et al. ................ 523/201

OTHER PUBLICATIONS

Chinese Office Action dated Jul. 28, 2015; from Chinese counterpart Application No. 201110337689.3.
Third Chinese Office Action dated Mar. 2, 2015 for counterpart Chinese Application No. 201110337689.3, 5 pages.
Response to Third Chinese Office Action filed Jun. 2, 2015 for counterpart Chinese Application No. 201110337689.3, 7 pages.
Chinese Response to Office Action dated Nov. 20, 2015; from Chinese counterpart Application No. 201110337689.3.
Chinese Response to Office Action dated Oct. 12, 2015; from Chinese counterpart Application No. 201110337689.3.

* cited by examiner

*Primary Examiner* — Irina S Zemel
*Assistant Examiner* — Jeffrey Lenihan

(57) ABSTRACT

A thermoplastic composition comprising the melt blending product of one or more thermoplastic polymers; and from 2 to 20 PHR, of one or more gloss reducing additives wherein each gloss reducing additive comprises a (meth)acrylate copolymer having a glass transition temperature of greater than or equal to 40° C. and 0.001 to 0.04 PHM derived from one or more crosslinking monomers and/or graft-linking agents having two or more ethylenically unsaturated radicals capable of free-radical polymerization, wherein a test specimen produced from the thermoplastic composition has roughness according to DIN 4768 of Ra greater than or equal to 0.6 microns, Rz greater than or equal to 6 microns, Rmax greater than or equal to 7 microns, and a gloss less than 65, 75 degree angle, is provided. Methods for producing the thermoplastic compositions, methods for producing articles from the thermoplastic compositions and such articles are also provided.

4 Claims, 1 Drawing Sheet

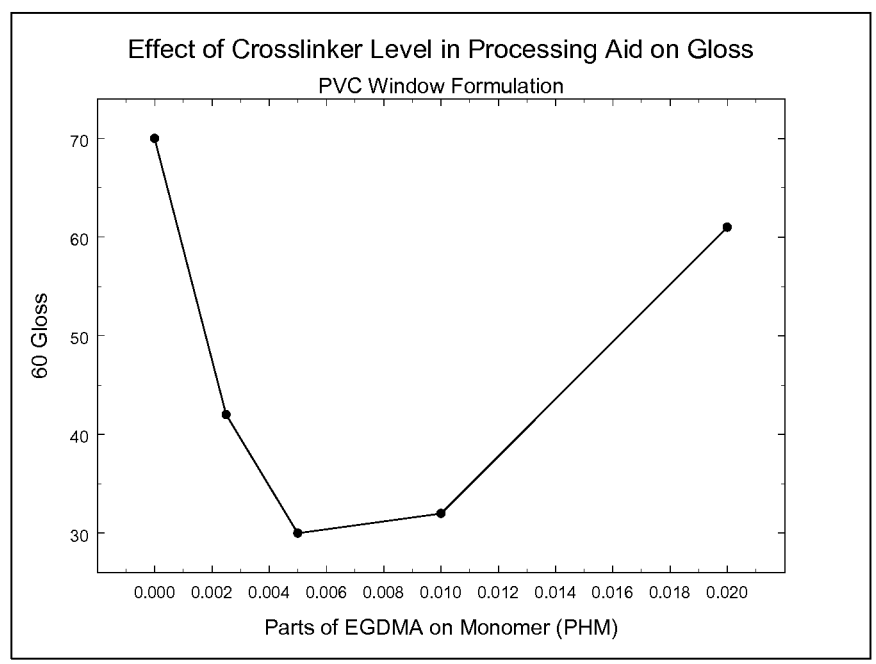

THERMOPLASTIC COMPOSITION, METHOD OF PRODUCING THE SAME, AND ARTICLES MADE THEREFROM

CROSS-REFERENCE TO RELATED APPLICATION

This application is a divisional of U.S. application Ser. No. 13/270,040, filed Oct. 10, 2011; which claim the benefit of U.S. Provisional Application No. 61/408,203 filed Oct. 23, 2010, the entire contents of which are hereby incorporated by reference.

FIELD OF THE INVENTION

The instant invention relates to a thermoplastic composition, method of producing the same, and articles made therefrom.

BACKGROUND OF THE INVENTION

Many applications of thermoplastic materials require a low gloss surface, including for example, thermoplastic panels with a wood-like appearance. Current approaches used to lower plastic surface gloss include the use of 5 to 15 wt % of 1 to 10 micron sized inorganic fillers and/or crosslinked polymeric particles plastic additives based on the total weight of the plastic formulation (i.e., base plastic or polymer plus all additives). Such inorganic and polymeric particles generally lower surface gloss by extending from the plastic surface providing a rough surface which destructively scatters light thereby decreasing gloss. Such additives, however, tend to significantly reduce the impact resistance of the plastic to which they are added. In addition, such additives generally make the final plastic formulation opaque.

Another issue with such known additives is the inability to maintain low gloss. Specifically, such particulate additives tend to be covered by the plastic material upon exposure to heat as the matrix polymer tends to flow around and over the particulate additives when heated after initial processing. For example, during thermal forming (or thermoforming), gloss will increase significantly for plastics with particulate additives. The particulate additive approach to decreasing the gloss of plastic surfaces is further subject to burnishing. Burnish resistance is the term used to describe resistance to gloss increase by rubbing. That is, the portion of the particulates which extend out from the plastic surface may be removed or broken off with rubbing of the plastic surface thereby leading to a smoother surface and increased gloss. A plastic formulation with low surface gloss, good impact resistance, good burnish resistance and which may be heat treated post initial processing without a substantial increase in gloss would be very desirable. Moreover, it would be desirable to have a plastic formulation in which the gloss reduction additive is compatible with the thermoplastic polymer matrix so as to provide a uniform sheet in melt processing, and specifically which is compatible with polymethyl methacrylate ("PMMA"), acrylonitrile butadiene styrene polymer ("ABS"), poly(styrene-co-acrylonitrile) ("SAN"), polyvinylchloride ("PVC"), acrylonitrile/styrene acrylate ("ASA"), chlorinated polyvinylchloride ("CPVC"), polylactic acid ("PLA"), polycarbonate ("PC"), polyesters, such as poly(ethylene terephthalate) ("PET"), poly(butylene terephthalate) ("PBT"), and polyethylene terephthalate glycol ("PETG").

SUMMARY OF THE INVENTION

The invention is a thermoplastic composition, method of producing the same, articles made therefrom, and methods for making such articles.

One embodiment of the invention provides a thermoplastic composition comprising the melt blending product of: a first component comprising one or more thermoplastic polymers; and from 2 to 20 parts by weight per hundred parts by weight of the first component (PHR) of a second component comprising one or more gloss reducing additive copolymers wherein each gloss reducing additive copolymer comprises a (meth)acrylate copolymer derived from one or more (meth)acrylate monomers and from 0.001 to 0.04 PHM (parts by weight per hundred parts by weight of the total weight of the one or more (meth)acrylate monomers) derived from one or more crosslinking monomers and/or graft-linking agents; wherein each gloss reducing additive copolymer has a glass transition temperature (Tg) of greater than or equal to 40° C. and wherein a test specimen produced from the thermoplastic composition (that is 2 inches wide and 40 mils thick produced by extrusion through a film die) has a roughness according to DIN 4768 of Ra greater than or equal to 0.6 microns, Rz greater than or equal to 6 microns and Rmax greater than or equal to 7 microns, and a gloss less than 65, 75 degree angle.

An alternative embodiment of the invention provides a composition comprising the melt blending product of: a first component comprising one or more thermoplastic polymers; and from 2 to 20 PHR of a second component comprising one or more gloss reducing additive copolymers wherein each gloss reducing additive copolymer comprises a (meth)acrylate copolymer derived from one or more (meth)acrylate monomers and from 0.001 to 0.04 PHM units derived from one or more crosslinking monomers and/or graft-linking agents; wherein each gloss reducing additive copolymer has a Tg of greater than or equal to 40° C. and wherein a test specimen produced from the thermoplastic composition (that is 2 inches wide and 40 mils thick produced by extrusion through a film die) has a gloss less than 65, 75 degree angle.

In an alternative embodiment, the gloss reducing additives of the second component further comprise one or more copolymers selected from the group consisting of styrenic polymers comprising one or more styrenic monomer units and (meth)acrylate/styrenic copolymers comprising one or more (meth)acrylate monomer units and one or more styrenic monomer units, wherein the styrenic monomer units are selected from the group consisting of styrene monomers, acrylonitrile monomers, and combinations thereof.

An alternative embodiment of the invention provides a thermoplastic composition comprising the melt blending product of: a first component comprising one or more thermoplastic polymers; and a second component comprising one or more core/shell polymers wherein said one or more core/shell polymers comprise a crosslinked core comprising from 0.001 to 0.04 PHM derived from one or more crosslinking monomers and/or graft-linking agents and one or more (meth)acrylate monomers polymerized to give a copolymer having a glass transition temperature of greater than or equal to 10° C., and one or more thermoplastic shells having a Tg of equal to or greater than 60° C. wherein the shell optionally contains from 0.001 to 0.04 PHM units derived from one or more crosslinking monomers and/or graft-linking agents, wherein the total amount of the one or more shells comprises 5 to 50 wt % of the total weight of the one or more core/shell polymers.

In another embodiment of the invention, the one or more (meth)acrylate copolymers comprise one or more monomers selected from the group consisting of $C_1$-$C_{18}$ (meth)acrylate monomer units and combinations thereof, wherein the one or more styrenic copolymers comprise one or more monomers selected from styrene monomers, acrylonitrile monomers, and combinations thereof, and wherein the one or more (meth)acrylate/styrenic copolymers comprise units derived from one or more monomers selected from the group of $C_1$-$C_{18}$ (meth)acrylate monomer units and combinations thereof and one or more monomers selected from styrene monomers, acrylonitrile monomers, and combinations thereof and optionally comprise from 0.001 to 0.04 PHM of units derived from one or more crosslinking monomers and/or graft-linking agents and combinations thereof.

In another alternative embodiment of the invention, the second component has a polymer particle volume average size less than or equal to 350 nm.

In an alternative embodiment of the invention, the second component has a polymer particle volume average size less from 70 to 250 nm.

In an alternative embodiment of the invention, the one or more (meth)acrylate copolymer of the one or more gloss reducing additives comprise from 50 to 95 percent by weight units derived from methylmethacrylate units and from 5 to 50 percent by weight units derived from ethylacrylate and/or butylacrylate units.

In an alternative embodiment of the invention, the one or more (meth)acrylate copolymers of the second component comprise from 65 to 85% by weight of units derived from methylmethacrylate and from 35 to 15 wt % units derived from ethylacrylate units and further wherein the gloss reducing additive comprises from 0.002 to 0.015 PHM of units derived from EDGMA.

In an alternative embodiment of the invention, the inventive thermoplastic composition has an impact value that is at least 90% of the impact value of the first component.

An alternative embodiment of the invention provides a method for producing a thermoplastic composition comprising: selecting a first component comprising one or more thermoplastic polymers; selecting a second component comprising one or more gloss reducing additive copolymers wherein each gloss reducing additive copolymer comprises a (meth)acrylate copolymer derived from one or more (meth)acrylate monomers from 0.001 to 0.04 PHM derived from units of one or more crosslinking monomers and/or graft-linking agents; wherein each gloss reducing additive copolymer has a glass transition temperature of greater than or equal to 40° C.; melt processing the second component into the first component wherein the second component is present in an amount of from 2 to 20 PHR; thereby producing the thermoplastic composition wherein a test specimen produced therefrom has roughness according to DIN 4768 of Ra greater than or equal to 0.6 microns, Rz greater than or equal to 6 microns and Rmax greater than or equal to 7 microns.

An alternative embodiment of the invention provides a method for producing a thermoplastic composition comprising: selecting a first component comprising one or more thermoplastic polymers; selecting a second component comprising one or more gloss reducing additive copolymers wherein each gloss reducing additive copolymer comprises a (meth)acrylate copolymer derived from one or more (meth)acrylate monomers and 0.001 to 0.04 PHM (parts per hundred monomer based on the weight of the one or more (meth)acrylate monomers) of units derived from one or more crosslinking monomers and/or graft-linking agents; wherein each gloss reducing additive copolymer has a glass transition temperature of greater than or equal to 40° C.; melt processing the second component into the first component wherein the second component is present in an amount of from 2 to 20 PHR; thereby producing the thermoplastic composition wherein a test specimen produced therefrom has a gloss of less than 65 when measured at an angle of 75 degrees.

An alternative embodiment of the invention provides a method for forming an article comprising: selecting an inventive thermoplastic composition; and forming the thermoplastic composition into an article.

In an alternative embodiment of the invention, the forming the thermoplastic composition into the article is selected from injection molding, rotational molding, thermoforming, calendering, extrusion, compression molding, and blow molding.

Another alternative embodiment of the invention provides an article formed from an inventive method.

In an alternative embodiment of the invention, the article made from an inventive thermoplastic composition and/or according to an inventive method has a gloss which is substantially independent of the shear rate during the step of forming the thermoplastic composition into the article.

In an alternative embodiment of the invention, the one or more thermoplastic polymers of the first component are selected from the group consisting PMMA, poly(styrene-co-acrylonitrile), acrylonitrile butadiene styrene polymer, polyamides, polyacrylates, thermoplastic polyesters, polyvinyl chloride, chlorinated polyvinyl chloride, polycarbonate, polylactic acid, polymethacrylate, acrylonitrile/styrene acrylate (ASA), polystyrene, blends thereof and combinations thereof.

In an alternative embodiment of the invention, a test specimen produced from the thermoplastic composition has a gloss of less than or equal to 65 at a 75 degree angle.

In an alternative embodiment of the invention, a gloss of a test specimen produced from the thermoplastic composition is not increased by more than 10% following thermoforming of the test specimen.

In an alternative embodiment of the invention, the crosslinking and/or graft-linking monomers are selected from the group consisting of divinylbenzene, trimethylolpropane triacrylate, ethylene glycol dimethacrylate, trimethylolpropane trimethacrylate, allyl methacrylate, diallyl phthalate, diallylacrylamide, triallyl(iso)cyanurate, triallyl trimelitate, (poly)alkylene glycol, 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, dipentaerythritol hexa(meth)acrylate, dipentaerythritol penta(meth)acrylate, graft-linking monomers having two or more non-conjugated double bonds of differing reactivity, such as allyl methacrylate, diallyl maleate and allyl acryloxypropionate, and combinations thereof.

Another alternative embodiment of the invention provides a thermoplastic composition consisting essentially of the melt blending product of: a first component comprising one or more thermoplastic polymers; and from 2 to 20 PHR of a second component comprising one or more gloss reducing additive copolymers wherein each gloss reducing additive copolymer comprises a (meth)acrylate copolymer derived from one or more (meth)acrylate monomers and 0.001 to 0.04 PHM derived from one or more crosslinking monomers and/or graft-linking agents; wherein each gloss reducing additive copolymer has a glass transition temperature of greater than or equal to 40° C. and wherein a test specimen produced from the thermoplastic composition (that is 2 inches wide and 40 mils thick produced by extrusion through a film die) has a roughness according to DIN 4768 of Ra greater than or equal to 0.6 microns, Rz greater than or equal to 6 microns and Rmax greater than or equal to 7 microns, and a gloss less than 65 at a 75 degree angle.

Yet another alternative embodiment of the invention provides a thermoplastic composition comprising the melt blending product of: a first component which consists essentially of one or more thermoplastic polymers; and from 2 to 20 PHR of a second component comprising one or more gloss reducing additive copolymers wherein each gloss reducing additive copolymer comprises a (meth)acrylate copolymer derived from one or more (meth)acrylate monomers and 0.001 to 0.04 PHM derived from one or more crosslinking monomers and/or graft-linking agents; wherein each gloss reducing additive copolymer has a glass transition temperature of greater than or equal to 40° C. and wherein a test specimen produced from the thermoplastic composition (that is 2 inches wide and 40 mils thick produced by extrusion through a film die) has a roughness according to DIN 4768 of Ra greater than or equal to 0.6 microns, Rz greater than or equal to 6 microns and Rmax greater than or equal to 7 microns, and a gloss less than 65 at a 75 degree angle.

Yet another alternative embodiment of the invention provides a thermoplastic composition comprising the melt blending product of: a first component comprising one or more thermoplastic polymers; and from 2 to 20 PHR, based on 100 parts by weight of the first component, of a second component which consists essentially of one or more gloss reducing additive copolymers wherein each gloss reducing additive copolymer comprises a (meth)acrylate copolymer derived from one or more (meth)acrylate monomers and 0.001 to 0.04 PHM derived from one or more crosslinking monomers and/or graft-linking agents; wherein each gloss reducing additive copolymer has a glass transition temperature of greater than or equal to 40° C. and wherein a test specimen produced from the thermoplastic composition (that is 2 inches wide and 40 mils thick produced by extrusion through a film die) has a roughness according to DIN 4768 of Ra greater than or equal to 0.6 microns, Rz greater than or equal to 6 microns and Rmax greater than or equal to 7 microns, and a gloss less than 65 @75 degree angle.

Yet another alternative embodiment of the invention provides a composition consisting essentially of the melt blending product of: a first component comprising one or more thermoplastic polymers; and from 2 to 20 PHR of a second component comprising one or more gloss reducing additive copolymers wherein each gloss reducing additive copolymer comprises a (meth)acrylate copolymer derived from one or more (meth)acrylate monomers and 0.001 to 0.04 PHM derived from one or more crosslinking monomers and/or graft-linking agents; wherein each gloss reducing additive copolymer has a glass transition temperature of greater than or equal to 40° C. and wherein a test specimen produced from the thermoplastic composition (that is 2 inches wide and 40 mils thick produced by extrusion through a film die) has a gloss less than 65 at a 75 degree angle.

Yet another alternative embodiment of the invention provides a composition comprising the melt blending product of: a first component which consists essentially of one or more thermoplastic polymers; and from 2 to 20 PHR of a second component comprising one or more gloss reducing additive copolymers wherein each gloss reducing additive copolymer comprises a (meth)acrylate copolymer derived from one or more (meth)acrylate monomers and 0.001 to 0.04 PHM derived from one or more crosslinking monomers and/or graft-linking agents; wherein each gloss reducing additive copolymer has a glass transition temperature of greater than or equal to 40° C. and wherein a test specimen produced from the thermoplastic composition (that is 2 inches wide and 40 mils thick produced by extrusion through a film die) has a gloss less than 65 at a 75 degree angle.

An alternative embodiment of the invention provides a composition comprising the melt blending product of: a first component comprising one or more thermoplastic polymers; and from 2 to 20 PHR of a second component which consists essentially of one or more gloss reducing additive copolymers wherein each gloss reducing additive copolymer comprises a (meth)acrylate copolymer derived from one or more (meth)acrylate monomers and 0.001 to 0.04 PHM derived from one or more crosslinking monomers and/or graft-linking agents; wherein each gloss reducing additive copolymer has a glass transition temperature of greater than or equal to 40° C. and wherein a test specimen produced from the thermoplastic composition (that is 2 inches wide and 40 mils thick produced by extrusion through a film die) has a gloss less than 65 at a 75 degree angle.

An alternative embodiment of the invention provides a thermoplastic composition consisting essentially of the melt blending product of: a first component comprising one or more thermoplastic polymers; and a second component comprising one or more core/shell polymers wherein said one or more core/shell polymers comprise a crosslinked core comprising from 0.001 to 0.04 PHM derived from one or more crosslinking monomers and/or graft-linking agents and one or more (meth)acrylate monomers polymerized to give a copolymer having a glass transition temperature of greater than or equal to 10° C., and one or more thermoplastic shells having a Tg of equal to or greater than 60° C. wherein the shell optionally contains 0.001 and 0.04 PHM derived from one or more crosslinking monomers and/or graft-linking agents, wherein the total amount of the one or more shells comprises 5 to 50 wt % of the total weight of the one or more core/shell polymers.

An alternative embodiment of the invention provides a thermoplastic composition comprising the melt blending product of: a first component which consists essentially of one or more thermoplastic polymers; and a second component comprising one or more core/shell polymers wherein said one or more core/shell polymers comprise a crosslinked core comprising from 0.001 to 0.04 PHM derived from one or more crosslinking monomers and/or graft-linking agents and one or more (meth)acrylate monomers polymerized to give a copolymer having a glass transition temperature of greater than or equal to 10° C., and one or more thermoplastic shells having a Tg of equal to or greater than 60° C. wherein the shell optionally contains 0.001 and 0.04 PHM derived from one or more crosslinking monomers and/or graft-linking agents, wherein the total amount of the one or more shells comprises 5 to 50 wt % of the total weight of the one or more core/shell polymers.

An alternative embodiment of the invention provides a method for producing a thermoplastic composition consisting essentially of: selecting a first component comprising one or more thermoplastic polymers; selecting a second component comprising one or more gloss reducing additive copolymers wherein each gloss reducing additive copolymer comprises a (meth)acrylate copolymer derived from one or more (meth)acrylate monomers and from 0.001 to 0.04 PHM derived from one or more crosslinking monomers and/or graft-linking agents; wherein each gloss reducing additive copolymer has a glass transition temperature of greater than or equal to 40° C.; melt processing the second component into the first component wherein the second component is present in an amount of from 2 to 20 PHR; thereby producing the thermoplastic composition wherein a test specimen produced therefrom has roughness according to DIN 4768 in the range Ra greater than or equal to 0.6 microns, Rz greater than or equal to 6 microns and Rmax greater than or equal to 7 microns.

An alternative embodiment of the invention provides a method for producing a thermoplastic composition consisting essentially of: selecting a first component comprising one or more thermoplastic polymers; selecting a second component comprising one or more gloss reducing additive copolymers wherein each gloss reducing additive copolymer comprises a (meth)acrylate copolymer derived from one or more (meth)acrylate monomers and 0.001 to 0.04 PHM derived from one or more crosslinking monomers and/or graft-linking agents; wherein each gloss reducing additive copolymer has a glass transition temperature of greater than or equal to 40° C.; melt processing the second component into the first component wherein the second component is present in an amount of from 2 to 20 PHR; thereby producing the thermoplastic composition wherein a test specimen produced therefrom has a gloss of less than 65, at 75 degree angle.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 is a graph of the gloss, as a function of amount of crosslinker, of the thermoplastic compositions of Inventive Examples 1-4 at a 60 degree angle.

DETAILED DESCRIPTION OF PREFERRED EMBODIMENTS

The instant invention provides a thermoplastic composition, method of producing the same, and articles made therefrom.

The invention provides a thermoplastic composition comprising the melt blending product of: a first component comprising one or more thermoplastic polymers; and from 2 to 20 parts by weight per 100 parts by weight of the first component (PHR), of a second component comprising one or more gloss reducing additive copolymers wherein each gloss reducing additive copolymer comprises a (meth)acrylate copolymer derived from one or more (meth)acrylate monomers and 0.001 to 0.04 PHM (parts per hundred monomer based on the total weight of the one or more (meth)acrylate monomers) derived from one or more crosslinking monomers and/or graft-linking agents; wherein each gloss reducing additive copolymer has a glass transition temperature of greater than or equal to 40° C. and wherein a test specimen produced from the thermoplastic composition (that is 2 inches wide and 40 mils thick produced by extrusion through a film die) has a roughness according to DIN 4768 of Ra greater than or equal to 0.6 microns, Rz greater than or equal to 6 microns and Rmax greater than or equal to 7 microns, and a gloss less than 65 at a 75 degree angle.

The thermoplastic composition according to the present invention comprises a first component of one or more thermoplastic polymers. Exemplary thermoplastic polymers useful in the first component include, but are not limited to, PMMA, SAN, ASA, ABS, polyamides, polyarylates, thermoplastic polyesters (such as, PET, PETG, and PBT), polyamides, polyacrylates, polyvinyl chloride, chlorinated polyvinylchloride, polycarbonate, polylactic acid, polystyrene, polymethacrylate, blends thereof, and combinations thereof.

The thermoplastic composition comprises from 2 to 20 PHR of the second component, based on 100 parts of the first component. All individual values and subranges from 2 to 20 PHR are included herein and disclosed herein; for example, the PHR of the second component can be from a lower limit of 2, 3, 7, 9, 11, 13, 15, 17 or 19 PHR to an upper limit of 5, 7, 10, 12, 14, 17, or 20 PHR. For example, the PHR of the second component may be in the range of from 2 to 20 PHR, or in the alternative, from 3 to 9 PHR, or in the alternative, from 7 to 19 PHR.

In some embodiments of the thermoplastic composition, the one or more gloss reducing additives of the second component have a volume average polymer particle size from 70 to 350 nm. All individual values from 70 to 350 nm are included herein and disclosed herein; for example, the polymer particle size of the second component may have an upper limit of 350, 300, 250, 200, 150, 100, or 80 nm, and a lower limit of 70, 100, 150, 200, 250, 300 or 340 nm. For example, the average polymer particle size may be in the range of from 70 to 350 nm, or in the alternative, from 70 to 250 nm, or in the alternative, from 70 to 150 nm, or in the alternative, from 70 to 100 nm, or in the alternative, from 100 to 350 nm, or in the alternative, from 150 to 350 nm, or in the alternative, from 100 to 250 nm, or in the alternative, from 300 to 350 nm.

The one or more gloss reducing additives comprise from 0.001 to 0.04 PHM units derived from one or more crosslinking monomers and/or graft-linking agents. As used here the term "one or more multifunctional cross-linking monomers and/or graft-linking agents" means that one or more crosslinking monomers may be present, one or more graft-linking agents may be present or that one or more crosslinking monomers in combination with one or more graft-linking agent may be present. As used herein the terms "crosslinking monomer" and "graft-linking agent" mean monomeric units having two or more ethylenically unsaturated radicals capable of free-radical polymerization. All individual values and subranges from 0.001 to 0.04 PHM are included herein and disclosed herein; for example, an amount derived from the one or more crosslinking monomers and/or graft-linking agents may be present from a lower limit of 0.001, 0.003, 0.005, 0.006 or 0.009 PHM to an upper limit of 0.04, 0.03, 0.02, 0.01, or 0.008 PHM. For example, the PHM of units derived from the one or more crosslinking monomers and/or graft-linking agents may be in the range of from 0.001 to 0.04 PHM, or in the alternative, from 0.003 to 0.03 PHM, or in the alternative, from 0.005 to 0.02 PHM.

A crosslinking monomer useful in the gloss reducing additives is a monomer that has two or more reactive groups that are capable of participating in a polymerization reaction. Exemplary crosslinking monomers include, but are not limited to, divinylbenzene, trimethyolpropane triacrylate, ethylene glycol dimethacrylate (EGDMA), butylene glycol dimethacrylate (BGDMA), trimethyolpropane trimethacrylate, allyl methacrylate, blends thereof, and combinations thereof. In some embodiments, the second component may contain from 0.001 to 0.04 PHM derived from crosslinking monomer selected from the group consisting of divinylbenzene; allyl compounds including diallyl phthalate, diallylacrylamide, triallyl(iso)cyanurate, and triallyl trimelitate; (poly)alkylene glycol di(meth)acrylate compounds including 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri (meth)acrylate, dipentaerythritol hexa(meth)acrylate, and dipentaerythritol penta(meth)acrylate.

Graft-linking agents useful in the gloss reducing additives are polyethylenically unsaturated monomers copolymerizable with the monounsaturated monomers present in the second component, and having two or more non-conjugated double bonds of differing reactivity, as for example allyl methacrylate, diallyl maleate and allyl acryloxypropionate. The preferred graft-linking agent is allyl methacrylate.

The gloss reducing additives of the second component comprise a (meth)acrylate copolymer having a glass transition temperature of greater than or equal to 40° C., measured via DSC, second heat. All individual values and subranges from greater than 40° C. are included herein and disclosed herein; for example, the glass transition temperature of the (meth)acrylate copolymer of the second component can be from a lower limit of 40, 45, 50, 55, 60, 70, 80, 90, or 100° C. For example, the glass transition temperature may be in the range of from greater than 40° C., or in the alternative, the glass transition temperature may be in the range of from greater than 55° C. As used herein throughout "(meth)acrylate" means acrylate and/or methacrylate.

In some embodiments of the invention, the gloss reducing additives of the second component may further comprise one or more copolymers selected from styrenic polymers comprising one or more styrenic monomer units.

In some embodiments of the invention, the gloss reducing additives of the second component may further comprise one or more (meth)acrylate/styrenic copolymers comprising an amount derived from one or more (meth)acrylate monomer units selected from the group of $C_1$-$C_{18}$ (meth)acrylates and one or more styrenic monomer units.

Exemplary styrenic monomer units useful in the gloss reducing additives of the second component include styrene, acrylonitrile, blends thereof and combinations thereof.

(Meth)acrylate copolymers useful in the gloss reducing additives of the second component include one or more $C_1$-$C_{18}$ (meth)acrylate monomer units, including, by way of example and not limitation, butyl acrylate, ethylacrylate, 2-ethyl hexyl acrylate, propyl acrylate, methyl acrylate, hexyl acrylate, butylmethacrylate, methylmethacrylate, ethylhexyl methacrylate, stearyl acrylate, benzyl acrylate, blends thereof, and combinations thereof.

A test specimen produced from the inventive thermoplastic composition has a roughness measured according to DIN 4768 of Ra greater than or equal to 0.6 microns, Rz greater than or equal to 6 microns and Rmax greater than or equal to 7 microns. All individual values and subranges of Ra greater than 0.6 microns are included herein and disclosed herein; for example, the Ra can be from a lower limit of 0.6, 0.7, 0.8, 0.9, or 1.0 microns. All individual values and subranges of Rz greater than 6 microns are included herein and disclosed herein; for example, the Rz can be from a lower limit of 6, 7, 8, 9, or 10 microns. All individual values and subranges of Rmax greater than 7 microns are included herein and disclosed herein; for example, the Rmax can be from a lower limit of 7, 8, 9, 10, or 11 microns.

Another embodiment of the thermoplastic composition of the invention comprises the melt blending product of a first component comprising one or more thermoplastic polymers; and from 2 to 20 PHR of a second component comprising one or more gloss reducing additive copolymers wherein each gloss reducing additive copolymer comprises a (meth)acrylate copolymer derived from one or more (meth)acrylate monomers and from 0.001 to 0.04 PHM of units derived from one or more crosslinking monomers and/or graft-linking agents, polymerized to give a copolymer that has a glass transition temperature of greater than or equal to 40° C.; wherein a test specimen produced from the thermoplastic composition has a 75 degree gloss less than 65.

Another embodiment of the invention provides a thermoplastic composition comprising the melt blending product of a first component comprising one or more thermoplastic polymers; and a second component comprising one or more core/shell polymers wherein said one or more core/shell polymers comprise a crosslinked core comprising units derived from one or more (meth)acrylate monomers and from 0.001 to 0.04 PHM derived from one or more crosslinking monomers and/or graft-linking agents, polymerized to give a copolymer having a glass transition temperature of greater than or equal to 10° C., and one or more thermoplastic shells having a Tg of equal to or greater than 60° C. wherein the shell optionally comprises from 0.001 to 0.04 PHM derived from of one or more crosslinking monomers and/or graft-linking agents. The weight percentage of the core may be from 50 to 95 wt % and the one or more shells may be from 5 to 50 wt %, based on the total weight of the one or more core/shell polymers. All individual values and subranges of the amount of the core in the one or more core/shell polymers are included herein and disclosed herein; for example, the core may be from a lower limit of 50, 60, 70, 80, or 90 wt % of the total weight of the one or more core/shell polymers; and from an upper limit of 55, 65, 75, 85, or 95 wt % of the total weight of the one or more core/shell polymers. The amount of core in the one or more core/shell polymers may range from 50 to 95 wt %; or in the alternative from 55 to 75 wt %; or in the alternative, from 65 to 35 wt %; or in the alternative, from 50 to 65 wt %, based on the total weight of the one or more core/shell polymers. All individual values and subranges of the amount of one or more shells in the one or more core/shell polymers are included herein and disclosed herein; for example, the one or more shells may be from a lower limit of 5, 15, 25, 35, or 45 wt % of the total weight of the one or more core/shell polymers; and from an upper limit of 15, 25, 35, 45, or 50 wt % of the total weight of the one or more core/shell polymers. The amount of the one or more shells in the one or more core/shell polymers may range from 5 to 50 wt %; or in the alternative from 25 to 45 wt %; or in the alternative, from 15 to 35 wt %; or in the alternative, from 35 to 50 wt %, based on the total weight of the one or more core/shell polymers.

The thermoplastic composition comprises of first component comprising one or more thermoplastic polymers, as described hereinabove.

The thermoplastic composition comprises from 2 to 20 PHR of a second component comprising one or more core/shell polymers. All individual values from 2 to 20 PHR are included herein and disclosed herein; for example, the second component may be present in an amount from a lower limit of 2, 8, 12, 15, or 17 PHR, to an upper limit of 3, 5, 8, 10, 13, 15, 17 or 20 PHR.

In some embodiments, the core/shell polymers have a volume average particle size in the range of from 70 to 350 nm. All individual values and subranges from 70 to 350 nm are included herein and disclosed herein; for example, the average polymer particle size can be from a lower limit of 70, 100, 150, 200, 250 or 300 nm to an upper limit of 100, 200, 250, 300, or 350 nm. For example, the average polymer particle size may be in the range of from 70 to 350 nm, or in the alternative, from 70 to 250 nm, or in the alternative, from 70 to 150 nm, or in the alternative, from 70 to 100 nm, or in the alternative, from 100 to 350 nm, or in the alternative, from 150 to 350 nm, or in the alternative, from 100 to 250 nm, or in the alternative, from 300 to 350 nm.

The one or more core/shell polymers comprise a crosslinked core and an optionally crosslinked thermoplastic shell. The core/shell polymers may be produced via emulsion polymerization process, which produces a crosslinked core and an optionally crosslinked thermoplastic shell.

The core comprises a crosslinked core comprising units derived from one or more (meth)acrylate monomers and from 0.001 to 0.04 PHM derived from one or more crosslinking monomers and/or graft-linking agents, polymerized to give a (meth)acrylate copolymer that has a glass transition temperature of equal to or greater than 10° C. The (meth)acrylate copolymer useful in the core is as described hereinabove in connection with the gloss reducing additive.

The core/shell particles comprise one or more thermoplastic shells having a glass transition temperature of greater than or equal to 60° C. All ranges and subranges of greater than or equal to 60° C. are included herein and disclosed herein; for example, the Tg of the thermoplastic shells can be equal to or greater than 65° C.; in the alternative, equal to or greater than 70° C.; in the alternative, equal to or greater than 75° C.; in the alternative, equal to or greater than 80° C.; or in the alternative, equal to or greater than 85° C.

In some embodiments, the one or more thermoplastic shells are comprised predominantly of MMA monomer units. As used herein throughout the term "predominantly" means greater than 55 and less than 100 percent by weight, based on the total weight of the thermoplastic shell. All individual ranges and subranges between greater than 55 and less than 100 percent by weight are included herein and disclosed herein; for example, the one or more thermoplastic shells may have an optionally crosslinked MMA content by weight of greater than a lower limit of 55, 70, 80, or 90 percent and an upper limit of 99, 90, 85, or 75 percent. For example the thermoplastic shells may comprise units derived from MMA in the range of 55 to 99; or in the alternative, from 70 to 85; or in the alternative, from 80 to less than 100 percent by weight, based on the total weight of the thermoplastic shell.

The one or more thermoplastic shells may further comprise one or more (meth)acrylate copolymers, one or more (meth)acrylate/styrenic copolymers, one or more styrenic copolymers, or combinations thereof, all of which may include those options as described in connection with the gloss reducing additives.

In certain embodiments of the inventive thermoplastic shell composition, the (meth)acrylate copolymer of the one or more thermoplastic shells comprises between 50 and 95 percent by weight methylmethacrylate units and between 5 and 50 percent by weight units of ethylacrylate and/or butylacrylate. As used herein the term "ethylacrylate and/or butylacrylate" means solely ethylacrylate, solely butylacrylate or a combination of ethylacrylate and butylacrylate present.

In yet other embodiments of the inventive thermoplastic composition, the (meth)acrylate copolymer of the one or more thermoplastic shells comprises from 68 to 72 wt % derived from methylmethacrylate units and from 28 to 32 wt % derived from ethylacrylate units.

In some embodiments, the one or more shells may further comprise from 0.001 to 0.014 PHM derived from one or more crosslinking monomers and/or graft-linking agents. All ranges and subranges from 0.001 to 0.04 PHM are included herein and disclosed herein; for example, units derived from one or more crosslinking monomer and/or graft-linking agents may be present from an upper limit of 0.04, 0.03, 0.02, 0.01, or 0.008 PHM to a lower limit of 0.001, 0.003, 0.005, 0.006 or 0.009 PHM. For example, units derived from one or more crosslinking monomers and/or graft-linking agents in the one or more shells may be in the range of from 0.001 to 0.04 PHM, or in the alternative, from 0.003 to 0.03 PHM, or in the alternative, from 0.005 to 0.02 PHM.

Another embodiment of the invention provides a method for producing a thermoplastic composition comprising: selecting a first component comprising one or more thermoplastic polymers; selecting a second component comprising one or more gloss reducing additive copolymers wherein each gloss reducing additive copolymer comprises a (meth)acrylate copolymer derived from one or more (meth)acrylate monomers and 0.001 to 0.04 PHM derived from one or more crosslinking monomers and/or graft-linking agents; wherein each gloss reducing additive copolymer has a glass transition temperature of greater than or equal to 40° C.; melt processing the second component into the first component wherein the second component is present in an amount of from 2 to 20 PHR; thereby producing the thermoplastic composition wherein a test specimen produced therefrom has roughness according to DIN 4768 in the range Ra greater than or equal to 0.6 microns, Rz greater than or equal to 6 microns and Rmax greater than or equal to 7 microns.

In another embodiment of the invention, the method for producing a thermoplastic composition comprises the steps of: selecting a first component comprising one or more thermoplastic polymers; selecting a second component comprising one or more polymers which comprise a crosslinked core comprising units derived from one or more (meth)acrylate monomers and 0.001 to 0.04 PHM derived from one or more crosslinking monomers and/or graft-linking agents, polymerized to give a (meth)acrylate copolymer that has a glass transition temperature of greater than or equal to 10° C., and one or more thermoplastic shells having a glass transition temperature of greater than or equal to 60° C.; and melt kneading the second component into the first component.

In some embodiments of the invention, an article produced from the thermoplastic composition has a gloss measured according to ASTM D523 that is substantially independent of a shear rate during the melt kneading. As used herein, the term "substantially independent of a shear rate" means that the gloss does not change by more than 10 units of gloss, at a 75 degree angle, over a 5 fold increase in extruder rpm. In some embodiments, the inventive thermoplastic compositions exhibit a gloss measured according to ASTM D523 which is not increased by more than 10% following thermoforming of an article from the thermoplastic composition.

The invention further provides an article comprising any one or more of the inventive thermoplastic compositions. The thermoplastic compositions disclosed herein can be used to manufacture durable articles for the automotive, construction, medical, food and beverage, electrical, appliance, business machine, and consumer markets. In some embodiments, the thermoplastic compositions are used to manufacture flexible durable parts or articles selected from window profiles, house siding, household appliances automotive interior and exterior trims. Additionally the thermoplastic compositions of the present invention may also be formed into consumer and sporting-goods.

The thermoplastic compositions can be used to prepare these durable parts or articles with known polymer processes such as extrusion (e.g., sheet extrusion and profile extrusion); molding (e.g., injection molding, rotational molding, and blow molding); and blown film and cast film processes. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum.

Molding is generally a process by which a polymer is melted and led into a mold, which is the inverse of the desired shape, to form parts of the desired shape and size. Molding can be pressureless or pressure-assisted.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene.

Articles produced from the inventive thermoplastic compositions exhibit a lower gloss than articles produced from solely the first component thermoplastic polymers. Specifically, an article formed from the inventive thermoplastic compositions exhibits a gloss of less than or equal to 65 measured at a 75 degree angle according to ASTM D523.

Articles produced from the thermoplastic compositions described herein exhibit an impact strength which is not substantially less than the impact strength articles produced from solely the first component thermoplastic polymers. Specifically, an article formed from the inventive thermoplastic compositions exhibits an impact strength measured according to ASTM D4226 that is at least 90% of the impact strength of an article formed from the first component thermoplastic polymer without a second component.

The thermoplastic compositions of the present invention may further include additional additives including, but are not limited to, antistatic agents, color enhancers, dyes, lubricants, fillers, flame retardants, pigments, primary antioxidants, secondary antioxidants, processing aids, impact modifiers, UV stabilizers, plasticizers, blends thereof, and combinations thereof. The inventive thermoplastic compositions may contain any amounts of additives. The inventive thermoplastic compositions may compromise from greater than 0 to less than 60 weight percent of the combined weight of such additives, based on the weight of the inventive thermoplastic composition including such additives. All individual values and subranges from about 0 to about 60 wt percent are included herein and disclosed herein; for example, the inventive thermoplastic compositions may compromise from 0 to 60 wt % of the combined weight of additives; or in the alternative, from 0 to 50 wt %; or in the alternative, from 0 to 30 wt %; or in the alternative, from 0 to 20 wt %; or in the alternative, from 0 to 10 wt %; or in the alternative, from 0 to 5 wt %.

As used herein, the term PHR means parts per hundred resin by weight. For example, 10 PHR additive means 10 parts by weight of additive per 100 parts by weight resin. More specifically, for example, 10 PHR additive may mean 10 pounds of additive per 100 pounds of resin. As used herein, the term PHM means parts per hundred monomer. For example, 0.04 PHM crosslinking monomer in a core/shell polymer comprising (meth)acrylate monomer units means that the core/shell polymer has 0.04 parts per 100 parts of the (meth)acrylate monomers.

EXAMPLES

Table 1 lists the source and composition of the components used in preparing the Inventive and Comparative Examples.

TABLE 1

| Component | Composition | Source |
| --- | --- | --- |
| DOWFAX ™ 2A1 | Alkyldiphenyloxide Disulfonate Anionic Surfactant | Dow Chemical Company |
| PARALOID ™ LFR-2006 | Impact modified PMMA/acrylate copolymer. | Dow Chemical Company |
| PLEXIGLAS ™ VS-100 | PMMA copolymer | Altuglas International division of Arkema |
| LURAN ™ 358N SAN | Styrene acrylonitrile copolymer | BASF Corp. |
| TELURLAN ™ GP-22 ABS | Acrylonitrile butadiene styrene copolymer. | BASF Corp. |
| PARALOID ™ EXL-5136 | 5 micron particle size, crosslinked acrylic copolymer particles. | Dow Chemical Company |
| PARALOID ™ KF-710 | 10 to 30 micron particle size, crosslinked styrene/acrylate copolymer particles. | Dow Chemical Company |
| OxyVinyls ™ 222 | Polyvinyl Chloride Powder (PVC) | OxyVinyls LP, Dallas Tx |
| ADVASTAB ™ TM-181 | Tin stabilizer for PVC | Dow Chemical Company |
| ADVALUBE ™ B-3314 | Lubricant for PVC | Dow Chemical Company |
| OMYACARB ™ UFT | Calcium carbonate filler | Omya Inc. |
| TI-PURE ™ R-960 | Titanium dioxide | The du Pont Chemical Co |
| PARALOID ™ K-120N | Acrylic processing aid for PVC | Dow Chemical Company |
| PARALOID ™ K-175 | Acrylic processing aid for PVC | Dow Chemical Company |

Inventive Examples 1-4 and Comparative Example 1

Crosslinker Level Effect on Gloss Reducing Properties

The second components added to each of Inventive Examples 1-4 were prepared according to the following procedure, which is a two shot emulsion polymerization method. The compositions of the second components added to each of Inventive Examples 1-4 varied by amount of EGDMA and had an overall composition of 84 PHR MMA/4 PHR BMA/12 PHR BA/variable amounts (PHM) of EGDMA.

1400 grams deionized water and 0.10 grams sodium hydroxide were charged to a round bottom five liter glass reactor. The contents of the glass reactor were stirred at 100 rpm and heated to 40° C. while sparging with dry nitrogen gas for 30 minutes. 10 grams (49.74% solids) of a Dowfax 2A1 surfactant, 0.14 grams of a EDTA, disodium salt, and 0.05 grams of iron sulfate heptahydrate were added to the glass reactor. The temperature was maintained at 40 (±2)° C. A monomer emulsion mixture consisting of: (1) 566 grams methyl methacrylate, 27 grams butyl methacrylate, 81 grams of butyl acrylate, and a variable amount of ethylene glycol dimethacrylate ("EGDMA") in 500 grams of water; (2) a solution of 1 gm of sodium persulfate in 20 gms water, and (3) and a solution of 0.11 grams of sodium formaldehyde sulfoxylate in 10 grams of water was then added to the glass reactor. The temperature of the glass reactor was maintained at 40 (±2)° C. The second components used in each of Inventive Examples 1, 2, 3, and 4 were produced using 0.14, 0.034, 0.07, and 0.14 PHM of EDGMA, respectively. The second component used in Comparative Example 1 was produced as above using no EGDMA.

The resulting latex in the glass reactor was cooled to 40° C. and 43 grams (49.74% solids) of a DOWFAX 2A1 surfactant was added to the latex. A mixture of: (1) 816 grams methyl methacrylate, 39 grams butyl methacrylate, 116 grams of butyl acrylate, and a variable amount of EGDMA and; (2) a solution of 0.44 grams of tert-butyl hydroperoxide, and a solution of 0.36 grams of sodium formaldehyde sulfoxylate in 10 grams of water were then added to the reactor. Heat was generated with this addition and the peak temperature of the latex mixture was held for about 10 minutes. During the peak temperature hold period, a solution containing 5.5 grams of Dowfax 2A1 and 15 grams of a 5% sodium persulfate was added. Following such addition, the temperature of the mixture was held at the peak temperature for 15 minutes, and then cooled to 40° C. The latex mixture was then discharged from the glass reactor through a cheesecloth filter. The second component was isolated by drying in a vacuum oven at 50° C. for 40 hrs or until the moisture content was less than 0.5 wt %. The second components used in Inventive Examples 1, 2, 3, and 4 were prepared by adding 0.0025, 0.005, 0.01, and 0.020 PHM of EDGMA, respectively, in this step of the process The second component samples were extruded in a PVC formulation using a Haake, conical, twin screw extruder. Zone 1 was set at 165 C; zone 2 set at 175 C; zone 3 set at 175 C. The RPMS were set at 40, and a 2 inch die with a die gap of 30 mils was used. The die was set at 175 C. The PVC formulation is shown in Table 2 and is referred to herein as the PVC masterbatch.

TABLE 2

| Material | PHR |
|---|---|
| OXYVINYLS ™ 222 | 100 |
| ADVASTAB ™ TM-181 | 1.2 |
| ADVALUBE ™ B-3314 | 2.7 |
| OMYACARB ™ UFT | 3 |
| TI-PURE ™ R-960 | 9 |
| PARALOID ™ K-120N | 1 |
| PARALOID ™ K-175 | 0.5 |
| Total | 117.4 |

This masterbatch formulation was blended in a high speed mixer and the second components were post added to the master batch at 5 PHR based on PVC resin (i.e., OxyVinyls™ 222)(50 grams of second component and 1174 grams of PVC master batch). Table 3 provides the results of gloss testing according to ASTM D523 of each of Inventive Examples (Inv. Ex.) 1-4 and Comparative Example (Com. Ex.) 1.

TABLE 3

| Example | PHM EGDMA in the second component | Gloss, 60 degree angle |
|---|---|---|
| Comp. Ex. 1 | — | 70.4 |
| Inv. Ex. 1 | 0.0025 | 42.0 |
| Inv. Ex. 2 | 0.005 | 30.1 |
| Inv. Ex. 3 | 0.01 | 31.5 |
| Inv. Ex. 4 | 0.02 | 60.5 |

As can be seen in Table 3, the surface gloss of the inventive thermoplastic blends goes through a minimum as the amount of EGDMA cross linker is increased. Thus, an optimal level of EGDMA is between 0.005 and 0.01 PHM EGDMA for this thermoplastic blend composition and process. Higher levels of EGDMA nevertheless showed lower gloss than Comparative Example 1 with no second component.

Inventive Examples 5-9 and Comparative Examples 2-3

Gloss testing on Inventive Examples 5-10 and Comparative Example 2 were conducted by blending the second components, as discussed below, to an impact modified acrylic resin, PARALOID™ LFR-2006, which is an impact modified PMMA/acrylate copolymer.

10 PHR of each second component was mixed with 100 parts of PARALOID™ LFR-2006 powder by bag mixing. The resulting blend was then extruded using a Haake, conical, twin screw extruder with the following conditions: zone 1 was at 165° C.; zone 2 was at 185° C.; zone 3 was at 185° C.; the screw operated at 100 rpm; using a 2 inch die with a gap of 35 mils; and a die temperature of 185° C. The composition of the second component was 70 wt % MMA/30 wt % EA/variable parts (PHM) EGDMA, as specified below.

The second components used in Inventive Examples 5-9 and Comparative Example 2 were prepared according to the general procedure described in Comparative Example 1, except that the levels of crosslinkers were varied as listed in Table 4.

Table 4 provides the gloss and other properties of Inventive Examples 5-9 and Comparative Examples 2-3.

TABLE 4

| Example | PHM EGDMA | Gloss, 75 degree angle | Solution Viscosity 5% in DPM | Solution % Transmittance 600 nm/1 cm cell | Dart Impact In-lb/40 mil |
|---|---|---|---|---|---|
| Comparative Example 3 | 0 | 118 | — | — | 39 |
| Comparative Example 2 | 0 | 78 | 5040 | 100 | 52 |
| Inventive Example 5 | 0.012 | 29 | 600 | 29.3 | 45 |
| Inventive Example 6 | 0.05 | 95 | 36 | 3.9 | 39 |
| Inventive Example 7 | 0.1 | 102 | 28 | 6.9 | 40 |
| Inventive Example 8 | 0.2 | 107 | 12 | 1.4 | 42 |
| Inventive Example 9 | 0.4 | 110 | 12 | 0.7 | 42 |

As can be seen in Table 4, at levels above 0.05 PHM EGDMA gloss increased almost to the level of Comparative Example 3 which contained no second component. Solution viscosity decreased as the crosslinker level, i.e. EGDMA level, is increased as the polymer becomes less soluble and therefore, does not expand as much in the solvent. The opaqueness of the solution also increased as the crosslinker level increases, once again demonstrating that the polymer is becoming less soluble as crosslinker level is increased. The impact resistance was not compromised by the second component, as evidenced by the impact testing results shown in Table 4.

Inventive Examples 10-11

Effect of Gloss Reducing Additive Level in Thermoplastic Blend

A second component (70 wt % MMA/30 wt % EA/0.01 PHM EGDMA), as described below, was added at 5 PHR and 10 PHR based on the resin Paraloid™ LFR-2006 to form Inventive Examples 10 and 11, respectively.

The second component of Inventive Examples 10 and 11 was prepared according to the general procedure outlined in Example 1. The composition of the polymer thus prepared is (70 wt % MMA/30 wt % EA/0.01 PHM EGDMA).

The data shown in Table 5 below illustrates that the gloss reduction is proportional to the level of second component in the formulation and that the level of second component does not negatively affect impact resistance.

TABLE 5

| Example | PHR of second Component | Gloss, 75 degree angle | Dart impact In-lb/40 mils |
|---|---|---|---|
| Comparative Example 3 | 0 | 120 | 42 |
| Inventive Example 10 | 5 | 57 | 46 |
| Inventive Example 11 | 10 | 30 | 48 |

Inventive Example 12 and Comparative Examples 1, 4, and 5

Effect of High Crosslinking and Light Crosslinking on Impact Resistance

PARALOID™ EXL-5136 which is a 5 micron highly crosslinked particle and PARALOID™ KF-710 which is a 10 to 30 micron highly crosslinked particle were used to prepare Comparative Examples 4 and 5, respectively. Comparative Example 1 is the base PVC formulation shown in Table 2 with no gloss reducing additive.

The gloss reducing additive used in Inventive Example 12 was made according to the following procedure:

1400 grams deionized water and 0.10 grams sodium hydroxide were charged to a round bottom five liter glass reactor. The mixture was stirred at 100 rpm and heated to 40° C. while sparging with nitrogen for 30 minutes. 10 grams (49.74% solids) of a Dowfax 2A1 surfactant and 0.14 grams of a EDTA, disodium salt and 0.05 grams of iron sulfate heptahydrate were added to the reactor. The temperature was brought to 40 (±2)° C. A mixture of (1) 472 grams methyl methacrylate and 202 grams ethylacrylate, and 0.1 gram of ethylene glycol dimethacrylate (2) a solution of 1 gm of sodium persulfate in 20 grams water, (3) and a solution of 0.11 grams of sodium formaldehyde sulfoxylate in 10 grams of water were added to the reactor. After an exotherm was observed, it was allowed to reach peak temperature, following which the reactor was held at the peak temperature for about 10 minutes and then cooled to 40° C.

Subsequently, 43 grams (49.74% solids) of a Dowfax 2A1 surfactant and a mixture of (1) 680 grams methyl methacrylate and 291 grams ethylacrylate 0.145 grams of ethylene glycol dimethacrylate, (2) a solution of 0.44 grams of tert-butyl hydroperoxide, and a 0.36 grams of sodium formaldehyde sulfoxylate in 10 grams of water were then added to the reactor. An exotherm was observed and allowed to reach peak temperature and held at the peak temperature for about 10 minutes. During the hold period, 5.5 grams of Dowfax 2A1 and 15 grams of a 5% sodium persulfate solution were added to the reactor. Subsequently the resulting latex was then cooled to 40° C. The reactor contents were then discharged through cheesecloth. The second component was isolated by drying in a vacuum oven at 50° C. for 40 hrs or until the moisture content was less than 0.5%. The second component prepared as described hereinabove was added solely to Inventive Example 12 and not to any of Comparative Examples 1, 4, and 5.

Table 6 illustrates both gloss reduction and impact resistance effects of Inventive Example 12 and Comparative Examples 5-7 in PVC as the matrix polymer. PVC was extruded in the same way as Inventive Examples 1-4.

TABLE 6

| Example | PHR Second Component | Gloss, 20 degree angle | Gloss, 60 degree angle | Gloss, 85 degree angle | Dart Impact In-lb/40 mils |
|---|---|---|---|---|---|
| Comparative Example 1 Masterbatch from Table 2 | 0 | 21 | 72 | 82 | 140 |
| Inventive Example 12 | 5 | 2.7 | 19 | 63 | 160 |
| Comparative Example 5 | 5 | 2.1 | 12 | 15 | 60 Brittle Failure |
| Comparative Example 4 | 5 | 5.4 | 33 | 44 | 124 Brittle Failure |

Table 6 illustrates that while gloss can be lowered using large, highly crosslinked polymeric particles, the use of such materials reduced the dart impact resistance of the thermoplastic blend and resulted in brittle failure. In contrast, the lightly crosslinked second component utilized in Inventive Example 12 both lowered gloss and maintained impact resistance.

Inventive Examples 13-18 and Comparative Example 3

Differing Crosslinker Monomers

These examples utilize crosslinking monomers other than EGDMA but at a concentration which provides an equal number of moles of double bonds as provided by 0.012 PHM EGDMA (i.e., molar equivalents).

Each of Inventive Examples 13-18 were formed as 10 PHR of second component per 100 parts of PARALOID™ LFR-2006. All of Inventive Examples 13-18 have a composition of 70 wt % MMA/30 wt % EA/variable amounts of crosslinking monomer (as specified in Table 7) and were made according to the general procedure described in inventive Example 1. Comparative Example 3 is the PARALOID™ LFR-2006 with no second component.

TABLE 7

| Example | Gloss, 75 degree angle | Solution Viscosity (cps) | % Transparency 600 nm |
|---|---|---|---|
| Comparative Example 3 | 109 | — | — |
| Inventive Example 13 (0.012 EGDMA) | 31 | 600 | 45.3 |
| Inventive Example 14 (0.014 BGDMA) | 36 | 1200 | 64 |
| Inventive Example 15 (0.008 DVB) | 42 | 520 | 37 |
| Inventive Example 16 (0.0076 ALMA) | 60 | 6680 | 96 |
| Inventive Example 17 (0.014 TMPTA) | 39 | 440 | 24 |
| Inventive Example 18 (0.012 BGDA) | 32 | 520 | 23 |

BGDMA = butylene glycol dimethacrylate,
DVB = divinyl benzene,
ALMA = Allyl methacrylate,
TMPTA = trimethylolpropane triacrylate,
BGDA = butylenes glycol diacrylate.

As can be seen from the information in Table 7, a wide variety of crosslinkers may be used in forming the second components used in Inventive Examples 13-18 while still achieving gloss reduction.

Inventive Example 19

The effect of extruder RPM (revolutions per minute) on gloss was examined. Inventive Example 19 was prepared as described above in connection with Inventive Example 12 except that the final formulation of the second component used in Inventive Example 19 has a final composition ratio of 70 wt % MMA/30 wt % EA/0.012 PHM EGDMA. Inventive Example 19 was prepared by mixing 10 PHR of the second component with 100 parts PARALOID™ LFR-2006. Extrusion was conducted using the same procedure as for Inventive Examples 2-9 with the exception that the RPMs of the extruder were varied from 20 to 100 to examine the effect of extruder speed on gloss reduction. Comparative Example 3 is PARALOID™ LFR-2006 with no second component. The results are shown in Table 8.

TABLE 8

| Extruder RPM | Output rate Puller Setting | Gloss, 75 degree angle Inventive Example 19 | Gloss, 75 degree angle Comparative Example 3 |
|---|---|---|---|
| 20 | 12 | 32.4 | 108.5 |
| 50 | 20 | 31.2 | 105.7 |
| 100 | 39 | 28.4 | 105.5 |

Table 8 illustrates that the extruder RPMs do not appear to have any appreciable impact on the gloss reduction achieved with the inventive thermoplastic composition. Because the gloss is not dependent on extruder RPMs (shear and throughput rate), the gloss reduction is not likely to be caused by conventional melt fracture. In a melt fracture mechanism for gloss reduction, increasing extrusion rate increases the amount of melt fracture and gloss should decrease with increasing shear rate.

Inventive Example 20 and Comparative Example 3

The effect of extruder melt temperature on gloss was examined Inventive Example 20 was prepared as described above in connection with Inventive Example 1 except that the final formulation of the second component used in Inventive Example 20 has a final composition ratio of 70 wt % MMA/30 wt % EA/0.014 PHM BGDMA. Inventive Example 20 was prepared by mixing PARALOID™ LFR-2006, with a ratio of 10 PHR second component. Inventive Example 20 and Comparative Example 3 were extruded the same as were Inventive Examples 2-9 except that the zones were adjusted to give the melt temperatures shown in Table 9.

TABLE 9

| Melt Temperature ° C. | Gloss, 75 Degree angle Inventive Example 20 | Gloss, 75 Degree angle Comparative Example 3 |
|---|---|---|
| 185 | 37.5 | 102.1 |
| 199 | 32.7 | — |
| 219 | 29.9 | — |
| 229 | 31.5 | 114 |

In a melt fracture mechanism of gloss reduction, gloss would be expected to increase with increasing temperature as melt fracture is reduced with increasing temperature. In contrast to a melt fracture gloss reduction mechanism, increasing melt temperature shows essentially no effect on the gloss reduction achieved with Inventive Example 20.

Inventive Examples 21-23 and Comparative Examples 6-8

The use of lightly crosslinked gloss reducing additives was examined in a variety of matrix polymers. Table 10 lists the compositions of Inventive Examples 21-23. Comparative Examples 6-8 are matrix polymers with no second component added. The second component used in each of Inventive Examples 21-23 was prepared using the process described in Example 1, except that the final composition ratio of 70 wt % MMA/30 wt % EA/0.01 PHM EGDMA The second component was added at 10 PHR in each case to the different matrix polymers and extruded using the same procedure as for Inventive Examples 5-9.

TABLE 10

| Example | First component | Composition/Source of First Component | Second Component (PHR) |
|---|---|---|---|
| Comparative Example 6 | Plexiglas ® VS-100 | PMMA Copolymer from Arkema | 0 |
| Inventive Example 21 | Plexiglas ® VS-100 | | 10 |
| Comparative Example 7 | Luran ® 358N | Styrene acrylonitrile copolymer from BASF | 0 |
| Inventive Example 22 | Luran ® 358N SAN | | 10 |
| Comparative Example 8 | Telurlan ® GP-22 ABS | Acrylonitrile butadiene styrene copolymer from BASF | 0 |
| Inventive Example 23 | Telurlan ® GP-22 ABS | | 10 |

TABLE 11

| Example | Gloss, 20 degree angle | Gloss, 60 degree angle | Gloss, 75 degree angle | Dart Impact In-lb/40 mils |
|---|---|---|---|---|
| Comparative Example 6 | 67 | 132 | 140 | Too brittle to test |
| Inventive Example 21 | 11 | 48 | 88 | Too brittle to test |
| Comparative Example 7 | 58 | 136 | 132 | Too brittle to test |
| Inventive Example 22 | 0.8 | 6.6 | 28.1 | Too brittle to test |
| Comparative Example 8 | 51.5 | 95.4 | 100.8 | 60.5 |
| Inventive Example 23 | 1 | 6.6 | 27.2 | 58.2 |

Table 11 includes the gloss and impact resistance for each of Inventive Examples 21-23 and Comparative Examples 6-8.

As can be seen, the lightly crosslinked second components used in the inventive thermoplastic composition using a variety of matrix polymers is effective at significantly reducing the gloss over that of the matrix polymer without the second component. Moreover, in at least Telurlan GP-22 matrix polymer, there is no negative affect on impact resistance. As shown in previous inventive examples, the inventive thermoplastic compositions based on PVC and impact modified PMMA copolymers also exhibit reduction in gloss and good impact resistance.

Inventive Example 12 and Comparative Examples 3, 5, and 9

The effect of heating a test specimen, mimicking the effect of thermal forming, was tested by measuring the gloss of an extruded sheet before and following heating at 165° C. for 20 minutes in an oven. Extruded sheets were prepared using Inventive Example 12 (described above); Comparative Example 9 containing LFR-2006 and 10 PHR of PARALOID™ EXL-5136; Comparative Example 5 as previously stated, containing LFR-2006 and 5 PHR of PARALOID™ KF-710; and Comparative Example 3 containing solely PARALOID™ LFR-2006. The results of this testing is shown in Table 12. In comparison to each of Comparative Examples 9 and 5, Inventive Example 12 showed no increase in gloss following heating, and, in fact, exhibited a slight decrease in gloss following heating.

TABLE 12

| Example | Initial Gloss, 75 degree angle | Gloss, 75 degree angle, after heating | Change in Gloss |
|---|---|---|---|
| Comparative Example 3 | 112 | 108 | −4 |
| Inventive Example 12 | 30 | 26 | −4 |
| Comparative Example 9 | 56 | 91 | +35 |
| Comparative Example 5 | 64 | 88 | +24 |

Comparative Examples 10-16 and Inventive Example 13

The second component used in each of Comparative Examples 10-16 was made according to the following procedure:

A seed latex was first prepared by adding 500 grams deionized water and 0.04 grams sodium hydroxide to a round bottom five liter glass reactor. The reactor was stirred at 100 rpm and heated to 40° C. with sparging with dry nitrogen for 30 minutes. 4 grams (49.74% solids) of Dowfax 2A1, 0.05 grams sodium EDTA, and 0.03 grams iron sulfate heptahydrate were added to the reactor. The temperature was held at 40(±2)° C. A mixture of: (1) 117 grams methyl methacrylate, 117 grams isobutyl methacrylate acrylate and 12.3 grams of ethylene glycol dimethacrylate, (2) a solution of 0.4 grams of sodium persulfate in 20 grams water, (3) and a solution of 0.04 grams of sodium formaldehyde sulfoxylate in 10 grams of water was added to the reactor. After a peak temperature was observed, the peak temperature was held for about 10 minutes. The observed particle size of this latex was 186 nm.

Comparative Example 10 was prepared by the following procedure:

1100 grams deionized water and 138 grams of the seed (preparation described above, at 36% solids) were charged to a round bottom five liter glass reactor. The reactor was stirred at 100 rpm and heated to 40° C. with sparging with dry nitrogen for 30 minutes. 4 grams (49.74% solids) of a Dowfax 2A1 surfactant were added to the reactor. The temperature was adjusted to between 79-81° C. A mixture of: (1) 384 grams methyl methacrylate, 165 grams ethylacrylate and 1.38 grams of ethylene glycol dimethacrylate, (2) a solution of 2 grams of sodium persulfate in 60 grams water was added to the reactor over a period of 4 hours. The temperature was then held at 80° C. for another 120 minutes after which the mixture was discharged from the reactor through a 150 mesh filter.

Comparative Examples 11 and 12 were made by using 45 and 125 grams of the latex seed described above, respectively.

For each of Comparative Examples 10-12, the second component was added at a level of 10 PHR based on LFR-2006, except for Comparative Example 3 which is solely LFR-2006.

Inventive Example 13 was prepared as previously described.

The second component of Comparative Examples 20-23 (LTL4671/4672/4673/MLK8528) was prepared by the following procedure:

450 grams deionized water and 136 grams of the latex of Inventive Example 13 as a seed latex were charged to a round bottom five liter glass reactor. The reactor was stirred at 100 rpm and heated to 40° (±2)C with sparging with dry nitrogen for 30 minutes. 3 grams (49.74% solids) of a Dowfax 2A1 surfactant, 0.05 grams sodium EDTA, and 0.03 grams iron sulfate heptahydrate were added to the reactor. The temperature was adjusted to 40(±2)° C. A mixture of: (1) 172 grams methyl methacrylate, 74 grams ethylacrylate and 0.03 grams of ethylene glycol dimethacrylate, (2) a solution of 0.4 gm of sodium persulfate in 60 gms water and 0.04 gms of sodium formaldehyde sulfoxylate in 10 gms water was added to the reactor. After a peak temperature is observed, the reactor was held at peak temperature for 10 minutes and then cooled to 40° C. before collecting the sample.

Thus comparative Examples 13-16 were prepared by using 136, 25, 15, and 3 grams respectively of the seed latex, preparation described in Example 13, the preparation of which is described above.

TABLE 13

| | Particle Size Nm | Gloss, 75 degree angle | 5% Solution Viscosity (cps) | % Transmittance 600 nm | Dart Impact inch-lb/40 mils |
|---|---|---|---|---|---|
| Comparative Example 3 | — | 119 | — | — | 41 |
| Comparative Example 10 | 356 | 110 | 42 | 8.6 | 37 |
| Comparative Example 11 | 505 | 112 | 30 | 1.3 | 38 |
| Comparative Example 12 | 855 | 75 | 50 | 31 | 30 |
| Inventive Example 13 | 184 | 31 | 600 | 45.3 | 49 |
| Comparative Example 13 | 350 | 82 | 82 | 1.2 | 41 |
| Comparative Example 14 | 400 | 90 | 78 | 1.2 | 39 |
| Comparative Example 15 | 500 | 82 | 50 | 1.2 | 28 |
| Comparative Example 16 | 794 | 94 | 32 | 15 | 33 |

For Comparative Examples 10-12, as the particle size increases, the gloss starts to drop, but not as efficiently as in the inventive thermoplastic composition like inventive example 13. These examples contain 0.25 PHM of EGDMA and are moderately crosslinked.

Comparative Examples 13-16 are made according to the method that the inventive thermoplastic compositions are made, except they are made with a larger particle size. Despite the larger particle size, Comparative Examples 13-16 do not show a drop in gloss as would be expected from a gloss reduction mechanism depending upon large particles sticking out of the surface.

TABLE 14

| | PS (particle size) Nm | Ra Micron | Rz micron | Rmax Micron | Gloss, 75/60 Degree angle |
|---|---|---|---|---|---|
| Comparative Example 3 | — | 0.107 | 1.7 | 2.6 | 119/115 |
| Inventive Example 13 70 wt % MMA/30 wt % EA/0.012 PHM EGDMA | 184 | 0.806 | 8.1 | 10.1 | 31/7.5 |
| Inventive Example 15 70 wt % MMA/30 wt % EA/0.008 PHM DVB | 200 | 0.752 | 7.3 | 9.0 | 42/10.7 |
| Inventive Example 16 70 wt % MMA/30 wt % EA/0.0076 PHM ALMA | 183 | 0.664 | 6.4 | 7.8 | 60/18.2 |
| Comparative Example 12 69.75 wt % MMA/30 wt % EA/0.25 PHM EGDMA | 855 | 0.299 | 3.1 | 3.6 | 75/34 |

Each of the examples in Table 14 includes the second component at a level of 10 PHR per PARALOID™ LFR-2006 and extruded using the same procedure as for Inventive Examples 5-9.

Inventive Examples 24-27 and Comparative Example 1

The Effect of Polymer Tg on Gloss Reducing Properties

The samples were made according to the procedure outlined in Inventive Example 13. The MMA/EA ratio was varied from 86:14 to 60:40. Inventive Examples 24-27 each contained 5 PHR the second component per 100 parts of the PVC in the masterbatch of Table 2.

To show the effect of polymer Tg on gloss reduction, additives were added to the PVC master batch formulation and extruded as described in Comparative Ex 1. Inventive Examples 24-27 each contained 5 PHR the second component per 100 parts of PVC in the master batch. As shown in Table 15, as Tg was lowered, gloss decreased and leveled off at a calculated Tg around 60° C. Tg was calculated using the Gordon-Tayler equation, as detailed in Penzel, E, Rieger, J, and Schneider, H. A., "The Glass Transition Temperature of Random Copolymers: 1. Experimental Data and the Gordon Taylor Equation", Polymer, Vol. 38, No. 2, 1997, pp. 325-337. Specifically: $Tg=(Tg_A w_A + KTg_B w_B) \div (w_A + Kw_B)$, where $w_A$ and $w_B$ are the weight fractions and $Tg_A$ and $Tg_B$ the glass transition temperatures of the respective homopolymers. $Tg_A$ and $Tg_B$ are assigned such that $Tg_A<Tg_B$. K is a constant that depends on composition and the values are listed in the reference.1

TABLE 15

|  | Tg | Gloss, 60 degree |
|---|---|---|
| Comparative Example 1 No Additive |  | 72 |
| Inventive Example 24 86 wt % MMA/14 wt % EA/0.015 PHM EGDMA | 80.5 | 60 |
| Inventive Example 25 80 wt % MMA/20 wt % EA/0.015 PHM EGDMA | 74.3 | 34 |
| Inventive Example 26 70 wt % MMA/30 wt % EA/0.015 PHM EGDMA | 60.9 | 19 |
| Inventive Example 27 60 wt % MMA/40 wt % EA/0.015 PHM EGDMA | 48.6 | 17 |

Inventive Examples 28-35 and Comparative Example 3

The Use of Core/Shell Particles Where the Tg of Each Core Differs

For isolation of powders from emulsions by methods such as spray drying, it is advantageous to have a high Tg (greater than 60° C.) shell on particles so that the powder does not pack into a solid during storage. This is particularly a problem with polymers that have a Tg of less than 60° C.

In Inventive Examples 29-35, a core polymer is first made and a shell of PMMA is placed on the core. Inventive example 28 is just the core with no shell. The shell can be made with or without crosslinking monomer. In the following examples, the shell has a Tg of 105° C. The core polymers were prepared by the general procedure outlined for Inventive Example 13 except that different MMA to EA ratios were used to obtain the target Tg. A shell layer of either crosslinked or uncrosslinked MMA is added by the following procedure:

1300 grams of the latex prepared using the process described in connection with Inventive Example 1, containing 520 grams of polymer, with a composition of 80 PHR MMA/20PHR EA/0.012 PHM EGDMA, and 3 grams of Dowfax 2A1 were mixed in a glass reactor. The contents of the glass reactor were stirred at 100 rpm and heated to between 74-76° C. while sparging with dry nitrogen gas for 30 minutes. A mixture of: (1) 0.14 grams of sodium persulfate in 30 grams of water and (2) 90 grams MMA and 0.01 grams EGDMA, were fed to the reactor over a period of 60 minutes while the temperature was maintained between 74 and 76° C. After the feeds were complete, the reaction mixture was held at 75° C. for another 30 minutes, cooled to 40° C., filtered and freeze dried. The samples described in the Table 16 were prepared with the same procedure with no EGDMA crosslinker in Inventive Example 33-35. The second component was added at a rate of 10 PHR per 100 parts of PARALOID™ LFR-2006 and extruded as in Inventive Examples 5-9.

TABLE 16

|  | Gloss, 75 degree angle | Core Tg | 5% Solution Viscosity (cps) | % Transmittance 600 nm |
|---|---|---|---|---|
| Comparative Example 3 PARALOID ™ LFR-2006 with no additive | 120 | — | — | — |
| Inventive Example 28 70 wt % MMA/30 wt % EA/0.012 EGDMA | 33 |  | 600 | 45.3 |
| Inventive Example 29 Core 85% (80 wt % MMA/20 wt % EA/0.012 PHM EGDMA) Shell 15% (100 wt % MMA/0.012 PHM EGDMA) | 29 | 74.3 | 112 | 21 |
| Inventive Example 30 Core 85% (70.6 wt % MMA/29.4 wt % EA/0.012 PHM EGDMA) Shell 15% (100 wt % MMA/0.012 PHM EGDMA) | 25 | 61.7 | 158 | 22.4 |
| Inventive Example 31 Core 85% (60 wt % MMA/40 wt % EA/0.012 PHM EGDMA) Shell 15% (100 wt % MMA/0.012 PHM EGDMA) | 26 | 48.6 | 216 | 39.5 |
| Inventive Example 32 Core 85% (49.4 wt % MMA/50.6 wt % EA/0.012 PHM EGDMA) Shell 15% (100 wt % MMA/0.012 PHM EGDMA) | 23 | 36.7 | 272 | 51.8 |
| Inventive Example 33 Core 85% (60 wt % MMA/40 wt % EA/0.012 PHM EGDMA) Shell 15% (100 wt % MMA with no crosslinker) | 31 | 48.6 | — | — |
| Inventive Example 34 Core 85% (49.4 wt % MMA/50.6 wt % EA/0.012 PHM EGDMA) Shell 15% (100 wt % MMA with no crosslinker) | 29 | 36.7 | — | — |

TABLE 16-continued

|  | Gloss, 75 degree angle | Core Tg | 5% Solution Viscosity (cps) | % Transmittance 600 nm |
|---|---|---|---|---|
| Inventive Example 35 85% (24.7 wt % MMA/75.3 wt % EA/0.012 PHM EGDMA) Shell 15% (100 wt % MMA with no crosslinker) | 39 | 12.4 | | |

Test Methods

Polymer Particle Size

Polymer particle size was measured using very dilute aqueous dispersions, i.e., latexes (diluted to 0.001% solids) with a BI 90 (Brookhaven Instruments, Holtsville, N.Y.) particle size detector, utilizing Dynamic Light Scattering (15° and 90° scattering angles) and a laser light source. The signal was detected by a photodiode array and the data analyzed with a built in correlator.

Gloss

Gloss was measured according to ASTM D523. Specifically, gloss was measured on test samples using a Byk-Gardner hand held micro-gloss meter. Gloss was measured using 20, 60, 75, and 85 degree gloss meter geometries. For samples that were unpigmented, a black background was placed under the test sample before measuring gloss. Measurements were the average of three readings.

Solution Viscosity

Polymer samples were dissolved in di(propylene glycol) methyl ether (97% purity from Aldrich Chemical) as a 5% solution by shaking overnight. 4 oz. straight walled bottles were used containing 90 grams of total solution. The dissolved polymer was placed in a 25° C. water bath for 20 minutes and then the viscosity was measured using a Brookfield RVT viscometer. Spindle 5 was used at 100 rpms.

Percent Transmittance

The 5% solutions prepared for solution viscosity measurements were placed in 1 cm path length cells for a visible spectrophotometer. The percent transmittance was read against a blank of the pure solvent.

Impact

Impact was measured according to ASTM 4226, i.e., dart impact, on 2 inch wide extruded strips of polymer that were about 40 mils in thickness. A Gardener drop dart tester was used with a 2 lb weight. The dart had a 0.5 inch diameter, round tip. The height in inches needed to cause any breakage of the strip was recorded. The thickness of the strip was measured with a micrometer. Impact=(height in inches×2 lb×40)÷(strip thickness)=in-lb/40 mils.

Surface Roughness

Samples strips for testing were made by extrusion as describe in the relevant example. Roughly 3 by 5 cm sections were cut and adhered to 5 cm by 9 cm aluminum plates with double-sided tape. Additional tape was applied around the sides of the sections to keep them as flat as possible. The samples were sputtercoated with Au/Pd to increase reflectivity. A Wyko NT 1000 Optical Profilometer was used to examine the surface roughness with the experimental conditions listed in Table 17. A magnification of 10× was used, covering an area of roughly 0.25 mm² per scan. Five locations for each section were examined. The instrument's software calculates the following roughness measurements according to DIN4768: Ra (average height); Rz (ave. of 10 highest−ave. of 10 lowest); and Rmax(max height−min height).

TABLE 17

| Optical Profilometry | |
|---|---|
| Instrument | Wyko NT 1000 |
| Mode | VSI |
| Magnification | 2.5x, 10x |
| Speed | 3x |
| Backscan | 30-100 μm |
| Scan length | 300-360 μm |
| Sputtercoating | Au/Pd 80 sec. w/ Ladd Hummer 6.6 |

Opacity

Opacity was determined by visual inspection of the solution with a rating scale from 1 to 10. A rating of 1 indicates a perfectly clear solution and a rating of 10 indicates an opaque solution.

DSC

The glass transition is measured in a TA Instruments Q1000 Differential Scanning Calorimeter using a small sample of the polymer (5-20 mg) sealed in a small aluminum pan. The pan is placed in the DSC apparatus, and its heat flow response is recorded by scanning at a rate of 10° C./min from room temperature up to 180° C. The glass transition temperature is observed as a distinct shift in the heat flow curve.

The present invention may be embodied in other forms without departing from the spirit and the essential attributes thereof, and, accordingly, reference should be made to the appended claims, rather than to the foregoing specification, as indicating the scope of the invention.

We claim:

1. A method for producing a thermoplastic composition comprising the steps of:
   selecting a first component comprising one or more thermoplastic polymers;
   selecting a second component comprising one or more core/shell polymers wherein said one or more core/shell polymers comprise
      a crosslinked core comprising one or more gloss reducing polymeric additives wherein each gloss reducing additive copolymer comprises a (meth)acrylate copolymer having a glass transition temperature of greater than or equal to 10° C. and from 0.001 and 0.04 PHM derived from one or more crosslinking monomers and/or graft-linking agents, wherein the one or more (meth)acrylate copolymers comprise from 50 to 95 percent by weight units derived from methylmethacrylate units and from 5 to 50 percent by weight derived from ethylacrylate and/or butylacrylate units, and
      one or more, optionally crosslinked, thermoplastic shells having a Tg of equal to or greater than 60° C. wherein the total amount of the one or more shells comprises 5 to 50 wt % of the total weight of the one or more core/shell polymers; and melt blending the second component into the first component, wherein the second component is present in an amount of from 2 to 20 PHR;

thereby producing the thermoplastic composition wherein a test specimen produced from the thermoplastic composition exhibits one or more of the following properties: (a) a gloss less than 65, 75 degree angle and (b) a combination of a roughness according to DIN 4768 of Ra greater than or equal to 0.6 microns, Rz greater than or equal to 6 microns and Rmax greater than or equal to 7 microns.

2. The method for producing a thermoplastic composition according to claim 1, wherein the gloss reducing additives of the second component further comprise one or more copolymers selected from styrenic polymers comprising one or more styrenic monomer units and (meth)acrylate/styrenic copolymers comprising one or more (meth)acrylate monomer units and one or more styrenic monomer units, wherein the styrenic monomer units are selected from the group of styrene monomers, acrylonitrile monomers, and combinations thereof.

3. The method for producing a thermoplastic composition according to claim 1 wherein the (meth)acrylate monomer units are selected from the group of $C_1$-$C_{18}$ (meth)acrylate monomer units.

4. The method for producing a thermoplastic composition according to claim 1, wherein the second component has a polymer particle average volume size less than or equal to 350 nm.

* * * * *